United States Patent [19]

Phoenix et al.

[11] Patent Number: 5,412,794
[45] Date of Patent: May 2, 1995

[54] MICROPROCESSOR BASED SYSTEMS PROVIDING SIMULATED LOW VOLTAGE CONDITIONS FOR TESTING RESET CIRCUITS

[75] Inventors: John B. Phoenix, Birmingham; Kenneth Vincent, Alcester; David C. Hurst, West Midlands, all of England

[73] Assignee: Lucas Industries public limited company, Solihull, United Kingdom

[21] Appl. No.: 789,839

[22] Filed: Nov. 12, 1991

[30] Foreign Application Priority Data

Nov. 10, 1990 [GB] United Kingdom ............... 9024488

[51] Int. Cl.⁶ ........................................... G06F 9/455
[52] U.S. Cl. ................................. 395/500; 395/800; 364/DIG. 1; 364/221.2; 364/268.9; 364/729
[58] Field of Search ................ 395/575, 750, 800; 364/707; 371/12, 16, 66

[56] References Cited

U.S. PATENT DOCUMENTS

| 4,063,308 | 12/1977 | Collins et al. ............ 395/550 |
| 4,072,852 | 2/1978 | Hogan et al. ............ 371/12 |
| 4,263,647 | 4/1981 | Merrell et al. .......... 371/48 |
| 4,414,623 | 11/1983 | Davis et al. ............ 68/80 |
| 4,558,416 | 12/1985 | Pauwels et al. ......... 364/133 |
| 4,567,560 | 1/1986 | Polis et al. ............ 364/184 |
| 4,586,179 | 4/1986 | Sirazi et al. ........... 371/12 |
| 4,811,200 | 3/1989 | Wagner et al. . |
| 4,933,869 | 6/1990 | Gareis et al. .......... 364/483 |
| 5,065,083 | 11/1991 | Owens .................... 320/13 |
| 5,203,000 | 4/1993 | Folkes et al. .......... 371/66 |

FOREIGN PATENT DOCUMENTS

2030334 4/1980 United Kingdom .
2183411 10/1985 United Kingdom .
2241361 2/1991 United Kingdom .

*Primary Examiner*—Alyssa H. Bowler
*Assistant Examiner*—Mehmet Geckil
*Attorney, Agent, or Firm*—Oblon, Spivak, McClelland, Maier & Neustadt

[57] ABSTRACT

A microprocessor system having two microprocessors, each of which has its own reset circuit, and a circuit being provided which detects under-voltage in the system supply voltage, each of said microprocessors having circuitry associated with it for inducing a simulated low voltage condition on the reset circuit of the other microprocessor to test said under-voltage detection circuit and to measure the resulting reset period generated.

8 Claims, 4 Drawing Sheets

MICROPROCESSOR BASED SYSTEMS PROVIDING SIMULATED LOW VOLTAGE CONDITIONS FOR TESTING RESET CIRCUITS

FIELD OF THE INVENTION

The present invention relates to microprocessor based systems.

BACKGROUND OF THE INVENTION

Microprocessors are now used in a wide variety of safety-critical systems, for example antilock braking systems (ABS) and electro pneumatic braking systems (EPB) enable an electronic controller to override, or directly control, the ability of a driver to stop his vehicle. In the case of ABS, the controller has the capability to remove brake pressure from all of the brakes irrespective of any actions taken by the driver. Microprocessors at the heart of the controller thus need to be relied upon to operate predictably.

Manufacturers of microprocessors specify that these devices will function correctly if the supply voltage to the processor is within the range specified for that processor (often about 4 V to 7 V). If a voltage which is lower than that specified, is supplied to the processor then its behaviour cannot reliably be predicted. Once the processor starts behaving as such, even increasing the supply voltage to the specified value will not necessarily cause the processor to function correctly. For this reason, microprocessors are provided with a "reset" pin. When this pin is held at a specified voltage (normally below 1 V) the microprocessor will be inactive, with all its outputs in a specified state for all supply voltages below a level which would cause permanent damage to the processor. The supply voltage cannot rise instantly from zero to the specified operating voltage, so the reset pin must be held low when the power is applied to the processor and then raised higher once the specified voltage is attained, so that the processor can commence operating in a predictable manner.

In the case of both ABS and EPB controllers, it is known for each to use two microprocessors to ensure that the system will function safely if one of the processors fails. Dual computer cross-checking is employed, as described in our co-pending European Application No. 88311720, wherein one of the processors is a relatively expensive device, and performs all the main functions of the system, whereas the other processor, which is a much smaller, simpler and cheaper chip is used to monitor the actions of the main processor and to shut down the controller if the main processor appears to be malfunctioning.

The known controller employs a serially connected hardware reset for both microprocessors to monitor under or over-voltage conditions on the supply. If the supply is within the limits, the first reset period times out, followed by the second. Any out-of-limit excursions will cause the reset cycle to be repeated. A disadvantage of this system is that the time of each reset period cannot be accurately measured.

When power is applied to the controller it then becomes necessary to bring the processors out of the "reset" condition in a controlled manner. The voltage supplied to the microprocessors is controlled by a voltage regulator circuit within the controller, and this circuit draws power from the vehicle battery. If the voltage supplied to the controller drops due for example to engine cranking or a faulty connection, the voltage regulator may not be able to maintain the correct voltage on the microprocessors. A partial drop in supply voltage is potentially a hazardous condition, as there may be sufficient voltage for the processor to operate the solenoids which control the vehicle braking, while the processor is in an unpredictable mode of operation, as previously described.

If the supply voltage drops during the specified reset period, then the duration of this period must be extended. If the supply voltage drops after this, the processors must be put back into reset. The reset circuit includes a low voltage detection element which monitors the supply voltage and provides a signal in the form of voltage change on an output pin when the voltage drops below a specified level, e.g. 4.6 V. The smaller of the two processors is specified to operate between 3.5 V and 7.0 V, and the larger processor, better than 4.6 V to 7.0 V.

A circuit provided in the controllers performs the function of bringing the processors out of the reset condition, and back into the reset condition when the power supply is low, the respective circuits in the ABS and EPB controllers being made up of a combination of discrete components for each processor.

To ensure the safe operation of the controller under all circumstances, it is not sufficient just to provide a reset circuit which operates as described above.

As mentioned before, the microprocessors need to be relied upon to ensure safe braking at all times. Two microprocessors are used so that if one processor or one reset circuit develops a fault and the processor misbehaves, the second processor will detect this, disable the ABS system and also warn the driver that the ABS system must be serviced immediately. The possibility of a second fault developing before the ABS controller has been replaced, however, is acceptably small.

If a reset circuit of the type described is used, but never tested, it is possible for a fault to develop within the circuit serving one processor, and remain undetected. This may, for example, be a timing fault which does not cause the processor to fail, because under some conditions (of supply voltage and temperature perhaps) the processor can tolerate reset durations shorter than specified, or, it may be a low voltage sensing fault which is not detected because a low voltage condition does not occur. The fault, for whatever reason, will not be detected and persist for the life of the controller. The possibility of a second fault developing, which affects the other processor, and thus renders the system dangerous, within the life of the controller, is unacceptably high.

SUMMARY OF THE INVENTION

It is an object of the present invention to provide a microprocessor-based system which will substantially overcome the aforedescribed disadvantages.

In accordance with one aspect of the present invention, there is provided a microprocessor-based system, comprising a microprocessor having a reset circuit incorporating a circuit which detects under-voltage in the system supply voltage, and circuitry for inducing a simulated low voltage condition on said reset circuit to test said under-voltage detection circuit.

Preferably, said microprocessor system comprises two microprocessors, each of which has its own reset circuit, and a circuit which detects under-voltage in the system supply voltage, one of said microprocessors having circuitry for inducing a simulated low voltage condition on the reset circuit of the other microprocessor to test said under-voltage detection circuit.

Advantageously, said microprocessor based system comprises a plurality of microprocessors having reset circuits, and circuitry for inducing simulated low voltage conditions on the reset circuits of at least some of the microprocessors of the system so that some or all of the reset circuits are tested.

In accordance with a further aspect of the present invention, there is provided a system of two or more microprocessors each having reset circuits, wherein a microprocessor which is not in reset, that is, with the reset circuit deactivated, includes a means for measuring the duration of a reset period of one or more of the microprocessors, in order to test a timing element of the reset circuit, said one or more of the microprocessors having been forced into reset by the action of one of the microprocessors.

In accordance with a still further aspect of the present invention, there is provided a microprocessor-based system having a timer device separate from microprocessors in the system, for measuring the duration of a microprocessor reset signal.

In accordance with a still further aspect of the present invention, there is provided a multi-microprocessor based system comprising a device which is independent/separate of/from all microprocessors in the system which can simulate a low supply voltage condition to generate a reset condition, said device being enabled or disabled by one of said microprocessors and the system further comprising a timer for measuring the reset duration.

In accordance with a still further aspect of the present invention, there is provided a microprocessor based system wherein a reset condition is generated by simulating a low voltage condition by a device separate from all microprocessors in the system but which can be enabled or disabled by one or more of said microprocessors in order to check the functioning of the voltage measuring element in the reset circuit.

A preferred system in accordance with the present invention having at least two microprocessors thus uses a reset circuit of the type described above, but modified so that both the timing and low voltage sensing elements of the microprocessors can be tested, so that any fault will be detected as soon as it arises, and the driver warned to have the system serviced.

By way of example only, a specific embodiment of the present invention will now be described, with reference to the accompanying drawings, in which:

BRIEF DESCRIPTION OF THE DRAWINGS

In the case of both ABS and EPB controllers, two parallel reset systems are provided, as indicated in FIG. 1. The power supply voltage is measured by an under-voltage sensing integrated circuit (e.g. a Motorola MC 34064) designed for this specific purpose. As shown in FIG. 4, each reset circuit is comprised of a voltage measuring element and a timing element (FIG. 4 is described in more detail hereinafter). The voltage measuring element detects a drop in the supply voltage below acceptable limits, the latter being, for low supply voltages, the higher or highest of the low voltage limits specified for the microprocessors plus some amount to allow for component tolerances, and holds the reset line low while the condition persists. The timing element, which is comprised of a capacitor which charges through a resistor, holds the reset line low for a specified time after the voltage measuring element has indicated the presence of a good supply. In addition to these elements, circuitry is provided to simulate the occurrence of a low voltage condition to the voltage sensing element. The low voltage sensing element is fed from the supply through a series resistor. A transistor is arranged so that it can pull the voltage at the sensing element down below the threshold voltage of 4.6 V. The low voltage condition is simulated to check that the low voltage sensing element detects and responds to that condition.

The testing of the reset circuit, including the low voltage sensing elements, is carried out within approximately 200 ms of power being applied to the controller, i.e. immediately after the vehicle ignition is turned on.

Figure 1:
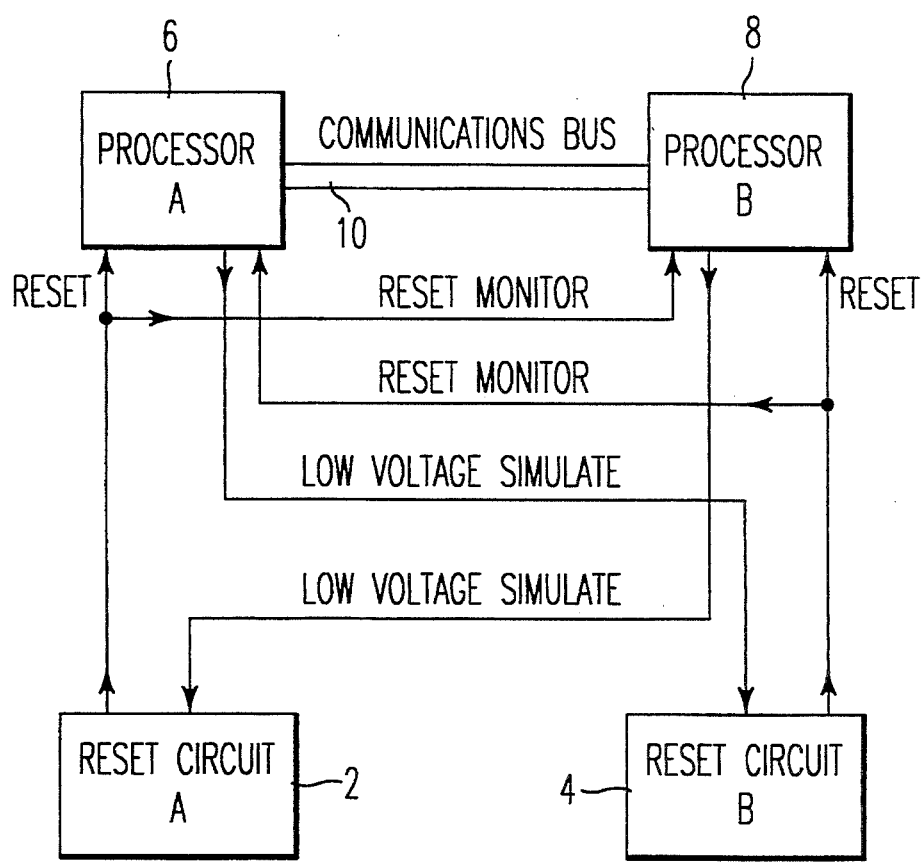
FIG. 1 is a schematic diagram of one embodiment of a microprocessor-based system having interactive reset circuits, in accordance with the present invention.

Referring now to FIG. 1, the two reset circuits 2, 4 are connected to the two microprocessors 6, 8 in such a way that each processor 6, 8 can trigger the simulation of a low voltage whereby the other processor 8, 6, respectively, will be put into reset. As the processors are unable to function when in the reset condition, and simulating a low voltage condition has the above effect, it is necessary that the processor which is not going into reset performs and monitors the test on the reset circuit serving the other processor. Furthermore each processor is provided with a signal which indicates that the other processor is in reset. The processors are also connected by a communications bus 10 which allows them to exchange information on the operating status, whilst they are both out of reset. The communications bus 10 is used for a conventional "checksum" data exchange and for passing other data between the processors 6, 8 during normal operation. During the reset test, the communications bus 10 is used to exchange specific data relating to the test. The complete reset test involves pulling both processors into reset, though not at the same time. When one processor has just emerged from reset, and thus effectively forgotten all that has gone before, the other processor uses the communications bus to inform it of the proportion of the test which has been performed, and of any faults detected.

When power is applied to the controller, both processors come out of reset, and send messages indicating that they have done so. Since both also receive messages with the same meaning, they are able to conclude that the power has just been applied and so no part of the reset test has been performed. The sequence of operation is controlled by software within the two processors.

A drop in supply voltage could potentially result in just one of the processors going into reset at any time. The other processor must be able to recognise the possibility of this event, by monitoring the supply voltage or the event itself. The resulting software structure includes so many checks that a complete flowchart would be immensely complex to reproduce herein.

Figure 2:
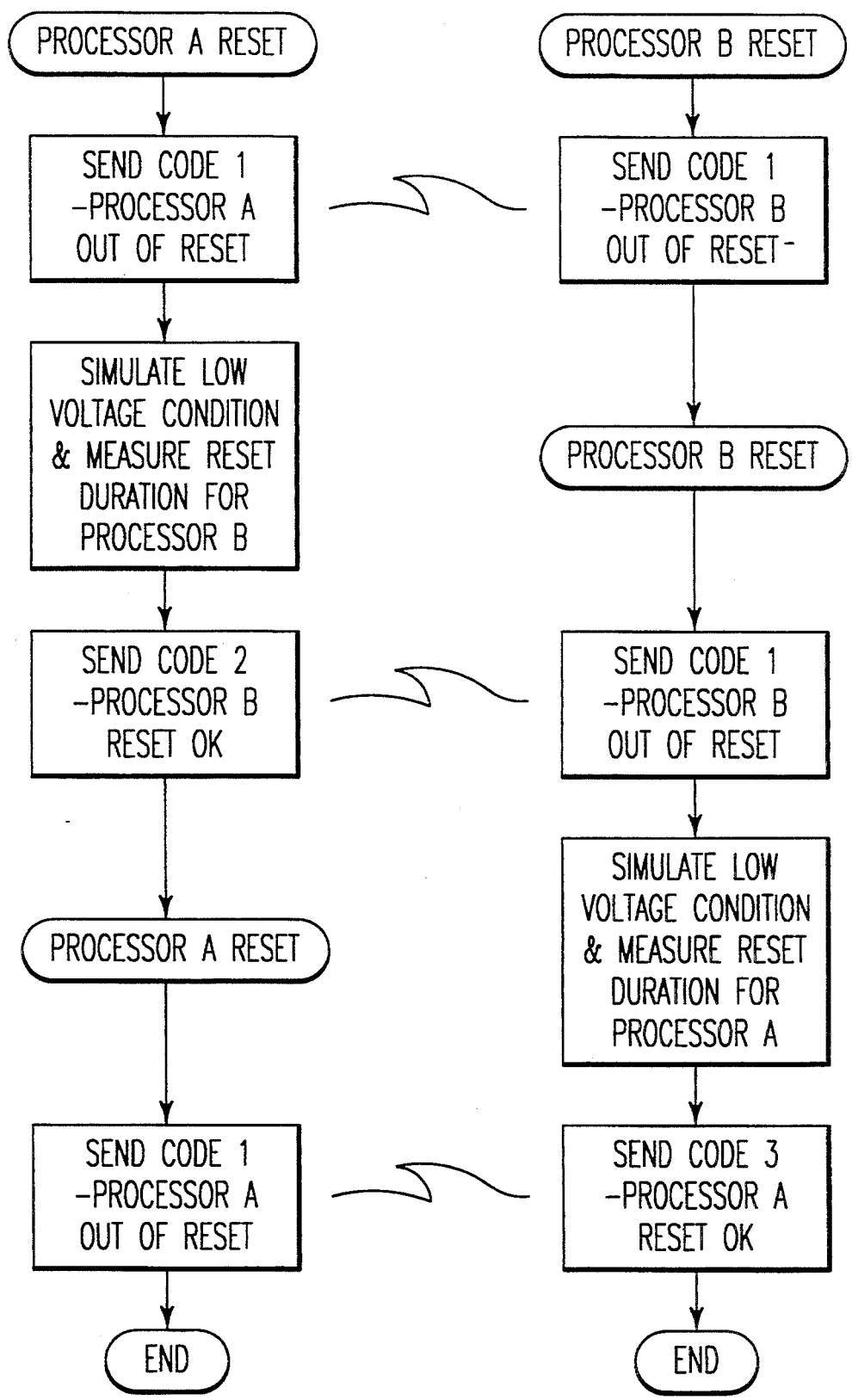
FIG. 2 is a simplified flowchart of a reset circuit test operation which assumes that no faults are seen during the test.
Figure 3:
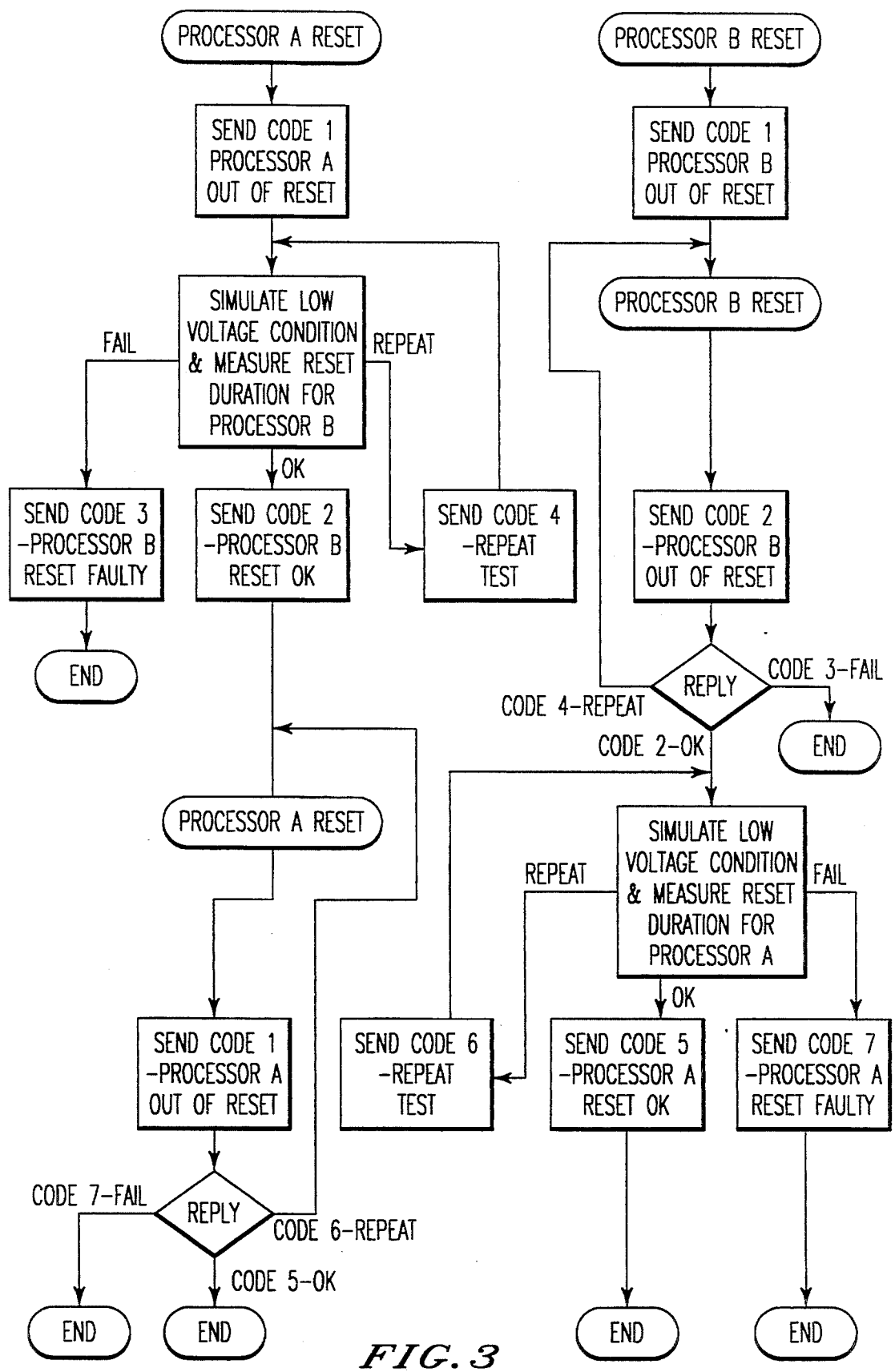
FIG. 3 is a simplified flowchart of reset circuit test operation which includes the possibility of faults being detected.

FIGS. 2 and 3 therefor show two simplified flowcharts describing in terms of a sequence of events, the operation of the reset test. The FIG. 2 situation assumes that no faults are seen during the test. FIG. 3 is a more complicated chart which includes the possibility of faults being detected, but does not allow for low voltage 'glitches' occurring, which could put one of the processors into reset at any time. Referring back to FIG. 1, after power is applied to the controller and both processors have come out of reset, and data exchanged over the communications bus, processor 6 then causes a low voltage condition to be simulated in reset circuit 4. This tests that the low voltage detection element is working correctly. Processor 6 monitors the reset state of processor 8, checking that it goes into reset, and that it stays in reset for a specified time. When processor 8 comes out of reset, the two processors again exchange data via the communications bus 10, processor 6 divulging information on the result of the test on reset circuit 2. Processor 8 then causes a low voltage condition to be simulated in reset circuit 6. In this way, reset circuit 2 is tested in the same way as reset circuit 4.

If the supply voltage falls near to the level where a processor may go into reset, this may interfere with the reset periods, and so both processors must monitor the supply voltage, and be prepared to repeat part or all of the test if a drop in the supply does affect the reset periods. The supply voltage can be monitored using analogue-to-digital converters on both processors. However, a simple threshold detector supplying a logic signal to both processors would suffice. If a drop in supply voltage occurs when one processor is in its reset condition, it could potentially increase the duration of that reset condition. This is measured by the other processor. The latter must, however, recognise that the result of this part of the test has been affected by the "glitch" in the supply and that this part of the test must be repeated in order to obtain a reliable result. If no other part of the test has been affected then there is no reason to repeat any other part of the test. The only extra costs in performing a full re-test rather than a part re-test is the extra time taken.

Once the test is successfully completed, processor 6 stores a number of indicator bytes in its RAM. When power is applied to most random access memory (RAM) devices, the initial contents of the latter are not precisely defined. However, the range of possibilities are limited, as the physical structure of the transistors making up each bit of memory predisposes them to power-up more often in one state than another. The indicator bytes stored in the RAM in processor 6 will be a fixed pattern of bits which are chosen to be highly unlikely to occur by chance when power is applied to the processor. The indicator bytes are chosen to be stored in only one processor. This simplifies the logic of the programming as only one processor needs to store and check these bytes, and no allowance need be made for a disagreement between the processors. (A disagreement would only really be possible if both processors had completed the reset test, set up the indicator bytes and then a power loss had caused one of the processors to forget some bits. In this case, nothing would really be lost, whichever processor was believed since the reset test had already been performed.)

If a drop in supply voltage causes the processors to go into reset, these indicator bytes should remain unaffected, so that the processor does not make an unnecessary repeat of the reset circuit test, when the priority may be to restore anti-lock brake control as soon as possible.

If total power is lost, and the indicator bytes are corrupted, the reset circuit test is performed again and a small amount of time is taken.

The indicator bytes, the number of which is fixed at the time of programming, serve as a flag to indicate that the reset test has been completed, with no fault having been detected since the ignition was last turned on. The greater the number of bits used, the smaller the likelihood that the processor will falsely believe that the test has been completed, since any bit seen to be incorrect will result in the complete reset test being performed.

The reset circuit tests are further improved by the incorporation of a memory which stores information concerning the reset periods measured by the two processors in a non-volatile memory. Since one possible failure mode of the reset circuit would occur if one of the components was to slowly change in value, this allows the processor to detect a fault developing in one of the reset circuits before the reset period has departed from the specification. The reset times specified for the particular circuits which have been used in practice are 13 to 40 ms. The data can be stored in some form of non-volatile memory, such as EPROM.

Figure 4:
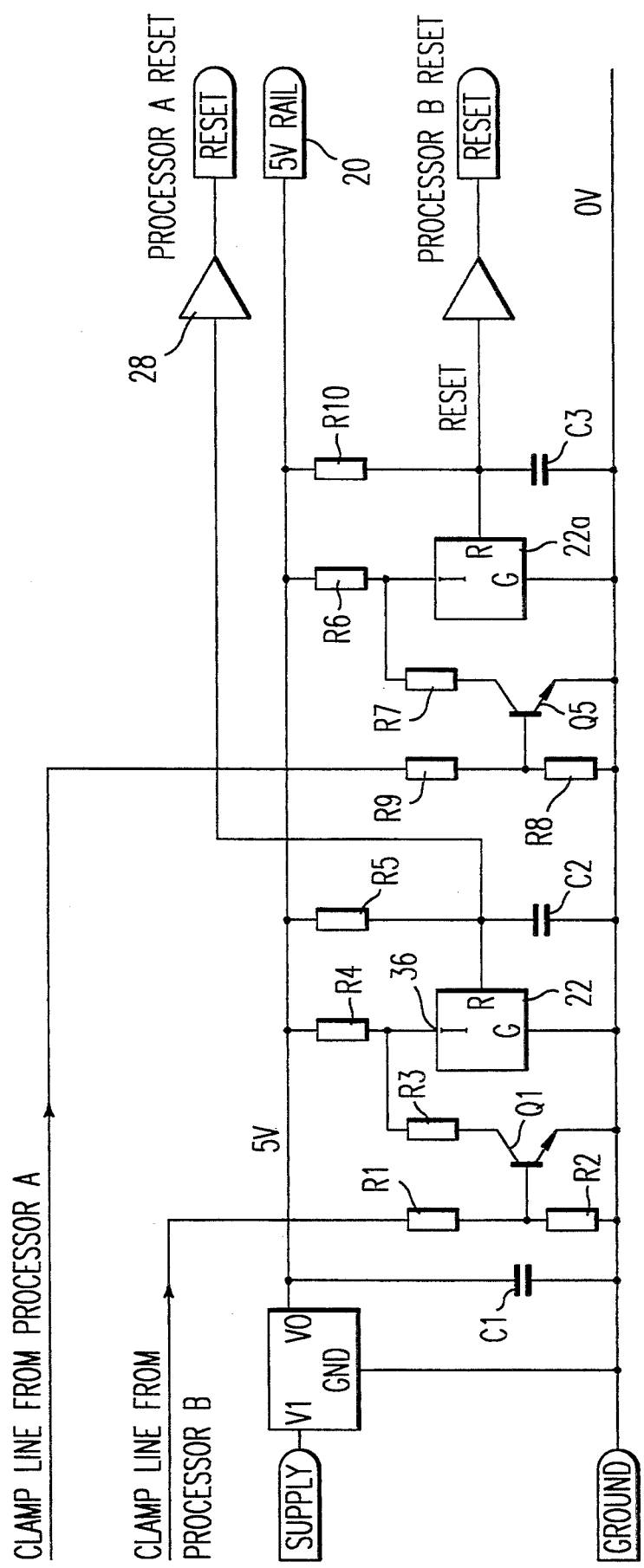
FIG. 4 is a circuit for a microprocessor system having interactive reset circuits.

In terms of hardware, to enable the processors to operate at the lowest supply voltage, resets are invoked by the state of the 5 V supply rail 20 (FIG. 4). As the 5 V rail 20 starts to drop, the voltage change is detected by two under voltage sensing units 22,22a which pull the reset pins of both processors A, B low (reset condition). When the supply returns, the under-voltage sensing units 22, 22a will turn off, allowing capacitors C2, C3 to charge and thereby set the reset period. To enable testing of the reset period, each processor A, B can cause the other to enter the reset condition by reducing the supply voltage of the appropriate under-voltage sensing unit 22, 22a.

As stated, hereinbefore, the reset function for both processors A, B is dependent on the state of the 5 volt supply rail 20. Since the reset action is identical for each output, only one is described in detail hereinafter.

If the rail voltage drops below 4.6 V, the output of the integrated circuit (IC) forming the under-voltage sensing unit 22 is arranged to go low, causing a reset. The under-voltage sensing IC 22 has an open collector output, and this output will discharge the timing capacitor C2 from 5 V in about 25 $\mu$s. When the rail voltage increases above the reset threshold (hysteresis of between 10 mV and 50 mV) capacitor C2 will charge via resistor R5. The time taken for this charging voltage to reach the switching level of a voltage level detection component 28 will set the reset delay.

Each reset circuit can be forced by the other processor, and this enables an accurate reset time to be established (since the processor causing the reset can time the response). The forced reset condition is generated in the following way: A logic high signal from the resetting processor (say processor B) via resistor R1 will cause transistor Q1 to conduct, thereby effectively grounding resistor R3. This action will reduce the supply voltage at pin 36 of the supply monitor IC 22 to around 4.0 V, forcing its output low (reset condition). This action will discharge the capacitor C2 to below the high threshold of component 28 making its output low, and thereby resetting the other processor. During the discharge phase, the additional current being supplied to discharge capacitor C2, causes an increased voltage drop across resistor R4. This additional voltage drop is sufficient to guarantee a full discharge time, as the additional voltage drop will act as hysteresis (i.e. capacitor C2 will always be fully discharged).

The foregoing describes the sequence of events for reset of processor A. A similar sequence takes place relative to reset of processor B utilizing transistor Q25 and resistors R9, R8 and R7.

Thus, advantageously, with each microprocessor initiating the other's reset, accurate timings can be calculated, and drift in the reset time can be logged. In addition, the components within the reset circuit are tested when a reset is forced. As the system differentiates between power-up reset and a glitch reset, a shorter start-up sequence can be initiated following a glitch reset. Also an advantage over the prior art, is a comparatively low component count.

We claim:

1. A microprocessor-controlled system, comprising:
   a first microprocessor;
   means for establishing a supply voltage for said microprocessor; and
   a reset circuit coupled to said microprocessor for holding the microprocessor in an inoperative reset condition;
   the reset circuit incorporating:
      a reset line coupled to said microprocessor;
      a low-voltage detection means for receiving said microprocessor supply voltage and producing a reset output signal level on said reset line if said microprocessor supply voltage falls below a predetermined level;
      a timing means for holding said detected reset output signal level on said reset line for a specified reset period after said low-voltage detection means has indicated a presence of said supply voltage at an acceptable level; and
      means for generating a simulated low voltage signal applied to said low-voltage detection means to force said reset circuit, and hence the microprocessor, into said reset condition, for testing purposes; and
   a second microprocessor coupled to said first microprocessor for the mutual exchange of information, each of said first and second microprocessors having its own reset circuit associated with it and each having a simulated low voltage signal generating means for inducing a simulated low voltage signal applied to said low-voltage detection means of said reset circuit associated with the other one of said first and second microprocessors.

2. A microprocessor-controlled system according to claim 1, wherein the second microprocessor is coupled to said first microprocessor for the mutual exchange of information to ensure that either one of said first and second microprocessors will control said system by itself if the other microprocessor fails.

3. A microprocessor-controlled system according to claim 1 including a timing means for measuring the duration of said reset period of that one of said microprocessors which has been forced into said reset condition by the application thereto by the other microprocessor of said simulated low voltage condition, in order to test that the measured duration is within acceptable limits.

4. A microprocessor-controlled system according to claim 1, wherein said simulated low voltage condition inducing means is separate from said microprocessors.

5. A microprocessor-controlled system according to claim 1, wherein said first microprocessor is one of a plurality of microprocessors coupled together for the mutual exchange of information; each of said plurality of microprocessors having its own reset circuit associated with it, at least some of said plurality of microprocessors having respective simulated low voltage condition inducing means for inducing a simulated low voltage condition at said low-voltage detection means of respective reset circuits associated with other of said plurality of microprocessors.

6. A microprocessor-controlled system according to claim 15, including a timing means for measuring the duration of said reset period of any one of said microprocessors which has been forced into said reset condition by the application thereto of said simulated low voltage condition for determining if the measured duration of said reset period is within acceptable limits.

7. A microprocessor-controlled system according to claim 15, wherein said simulated low-voltage condition inducing means is separate from all of said microprocessors.

8. A microprocessor-controlled system which comprises a plurality of microprocessors coupled together for the mutual exchange of information, means for establishing a supply voltage for said plurality of microprocessors, each of said plurality of microprocessors having its own reset circuit associated with it for holding that microprocessor in an inoperative reset condition, each reset circuit incorporating a reset line coupled to that microprocessor, a low-voltage detection means for receiving said microprocessor supply voltage and for producing a reset signal level on said reset line if said microprocessor supply voltage falls below a predetermined level, a timing means for holding said reset output signal level on said reset line for a specified reset period after said low-voltage detection means has indicated a presence of said supply voltage at an acceptable level, and a device which is separate from all said microprocessors and which includes means for inducing a simulated low voltage condition on said low-voltage detection means of all microprocessors to force said reset circuits, and hence all said microprocessors, into said reset condition for testing purposes.

* * * * *

UNITED STATES PATENT AND TRADEMARK OFFICE
CERTIFICATE OF CORRECTION

PATENT NO. : 5,412,794
DATED : May 2, 1995
INVENTOR(S) : John B. PHOENIX et al.

It is certified that error appears in the above-indentified patent and that said Letters Patent is hereby corrected as shown below:

Column 8, line 26, change "claim 15" to --claim 5--.

Column 8, line 33, change "claim 15" to --claim 5--.

Signed and Sealed this

Sixteenth Day of April, 1996

Attest:

BRUCE LEHMAN

*Attesting Officer*  Commissioner of Patents and Trademarks